(12) United States Patent
Kim et al.

(10) Patent No.: US 9,388,309 B2
(45) Date of Patent: Jul. 12, 2016

(54) POLYESTER RESIN COMPOSITION AND A PRODUCTION METHOD THEREFOR

(75) Inventors: Dong-Jin Kim, Seoul (KR); Won-Jae Yoon, Seoul (KR); Jong-Ryang Kim, Suwon-si (KR); Yoo-Jin Lee, Seoul (KR); Sin-Young Hwang, Seoul (KR)

(73) Assignee: SK CHEMICALS CO., LTD., Seongnam-Si, Gyeonggi-Do (KR)

( * ) Notice: Subject to any disclaimer, the term of this patent is extended or adjusted under 35 U.S.C. 154(b) by 262 days.

(21) Appl. No.: 13/979,513

(22) PCT Filed: Jan. 30, 2012

(86) PCT No.: PCT/KR2012/000669
§ 371 (c)(1),
(2), (4) Date: Jul. 12, 2013

(87) PCT Pub. No.: WO2012/105770
PCT Pub. Date: Aug. 9, 2012

(65) Prior Publication Data
US 2013/0295306 A1 Nov. 7, 2013

(30) Foreign Application Priority Data

Jan. 31, 2011 (KR) .......... 10-2011-0009405

(51) Int. Cl.
| | |
|---|---|
| *C08L 67/00* | (2006.01) |
| *C08G 63/672* | (2006.01) |
| *C08G 63/688* | (2006.01) |
| *C08G 63/692* | (2006.01) |
| *C08L 67/02* | (2006.01) |
| *C08K 5/134* | (2006.01) |
| *C08K 5/372* | (2006.01) |
| *C08K 5/527* | (2006.01) |

(52) U.S. Cl.
CPC .............. *C08L 67/00* (2013.01); *C08G 63/672* (2013.01); *C08G 63/6886* (2013.01); *C08G 63/6926* (2013.01); *C08K 5/1345* (2013.01); *C08K 5/372* (2013.01); *C08K 5/527* (2013.01); *C08L 67/02* (2013.01); *Y10T 428/1352* (2015.01)

(58) Field of Classification Search
CPC ....... C08L 67/00; C08L 67/02; C08G 63/672; C08G 63/6886; C08G 63/6926; C08K 5/372; C08K 5/1345; C08K 5/572; Y10T 428/1352
See application file for complete search history.

(56) References Cited

U.S. PATENT DOCUMENTS

| | | | |
|---|---|---|---|
| 4,110,411 | A | 8/1978 | Imanaka et al. |
| 5,049,603 | A | 9/1991 | Mochizuki |
| 5,959,066 | A | 9/1999 | Charbonneau et al. |
| 6,063,464 | A | 5/2000 | Charbonneau et al. |
| 6,140,422 | A | 10/2000 | Khanarian et al. |
| 6,359,070 | B1 | 3/2002 | Khanarian et al. |
| 6,656,577 | B1 | 12/2003 | Adelman et al. |
| 6,803,443 | B1 | 10/2004 | Ariga et al. |
| 2004/0092703 | A1 | 5/2004 | Germroth et al. |

FOREIGN PATENT DOCUMENTS

| | | |
|---|---|---|
| CN | 1047098 A | 11/1990 |
| EP | 0 397 456 A | 11/1990 |

*Primary Examiner* — Michael C Miggins
(74) *Attorney, Agent, or Firm* — Nath, Goldberg & Meyer; Tanya E. Harkins

(57) ABSTRACT

Disclosed are a copolymeric polyester resin composition having outstanding color stability (transparency) and a production method therefor. The copolymeric polyester resin composition comprises: between 95 and 99.99 percent by weight of a copolymeric polyester resin having a structure which is obtained by the copolymerization of a dicarboxylic acid component and a diol component that comprises isosorbide, and in which there is repetition of a dicarboxylic acid moiety derived from the dicarboxylic acid component and a diol moiety derived from the diol component; and between 0.01 and 5 percent by weight of an antioxidant selected from the group consisting of hindered phenol-based antioxidants, phosphite-based antioxidants, thioether-based antioxidants and mixtures thereof.

11 Claims, No Drawings

POLYESTER RESIN COMPOSITION AND A PRODUCTION METHOD THEREFOR

This is a National Phase application filed under 35 U.S.C. 371 as a national stage of PCT/KR2012/000669, filed on Jan. 30, 2012, an application claiming the benefit from Korean Application No. 10-2011-0009405, filed on Jan. 31, 2011, the entire content of each of which is hereby incorporated by reference in its entirety.

FIELD OF THE INVENTION

This invention relates to a polyester resin composition and preparing method thereof, and more particularly, to a polyester resin composition copolymerized with isosorbide and having superior color stability (transparency), and preparing method thereof.

BACKGROUNDS OF THE INVENTION

A polyester resin has been widely used in the fields of the packing materials, the articles and the films, and is one of the environment-friendly plastics which have no endocrine disruptors. Recently, regarding the polycarbonate which has been used as the heat-resisting container for food, harmfulness of bisphenol-A to the human being has been revealed, and, a need for the environment-friendly transparent and heat-resisting polyester resin has increased. The polyester resin which is copolymerized with at least two glycol or dicarboxylic acid components has been commercially widely used to improve a moldability thereof and to remove a crystallinity thereof. In the case of homopolyester which is polymerized with only terephthalic acid and ethylene glycol, material properties and heat-resistance thereof can be enhanced through a stretching-induced crystallization and heat-setting. However, there are limitations on application and enhancement of heat-resistance. In the case of polyester which is copolymerized with at least two glycol or terephthalic acid components, there is a disadvantage that it is difficult to enhance heat-resistance thereof by stretching or crystallize process. As another method to enhance heat-resistance of the polyester, it is known that the isosorbide (1,4:3,6-dianhydroglucitol) which is an environment-friendly diol compound derived from starch, is used as one of monomers.

U.S. Pat. No. 5,959,066 discloses a method for preparing polyester having the intrinsic viscosity of 0.35 dl/g or more by melt polymerization using terephthalic acid or dimethylterephthalate and various diols comprising isosorbide. The polyester resin having the intrinsic viscosity of 0.35 dl/g or more is used for optical products and coating, and the polyester resin having the intrinsic viscosity of 0.4 dl/g or more is used for CD, and the polyester resin having the intrinsic viscosity of 0.5 dl/g or more can be used for a bottle, a film, a sheet and injection molding. Moreover, U.S. Pat. No. 6,063,464 discloses a method for preparing the polyester having the intrinsic viscosity of 0.15 dl/g or more by melt polymerization using the glycol components comprising isosorbide. And, U.S. Pat. No. 6,656,577, U.S. Pat. No. 6,359,070, U.S. Pat. No. 6,140,422 and so on disclose a method for preparing the copolymerized polyester resin using the glycol components comprising isosorbide.

The above patents disclose a method for polymerizing polyester using common catalysts with all of acids and diols comprising isosorbide, however, it may cause yellowing during the synthesis or forming of polyester, therefore, a composition for color stability (transparency) is needed to be used for normal plastics.

SUMMARY OF THE INVENTION

Therefore, it is an object of the present invention to provide a copolymerized polyester resin composition which has superior color stability (transparency), and a preparing method thereof.

In order to achieve these objects, the present invention provides a copolymerized polyester resin composition comprising: 95 to 99.99 weight % of a copolymerized polyester resin copolymerized with dicarboxylic acid components and diol components comprising isosorbide, having an alternating structure of dicarboxylic acid moieties which are derived from dicarboxylic acid components and diol moieties which are derived from diol components; and 0.01 to 5 weight % of an antioxidant selected from the group consisting of a hindered phenolic antioxidant, a phosphitic antioxidant, a thioetheric antioxidant and mixtures thereof.

The present invention also provides a method for preparing copolymerized polyester resin composition, comprising the steps of: carrying out an esterification reaction or a trans-esterification reaction of dicarboxylic acid components, and diol components comprising isosorbide at the increased pressure of 0 to 10.0 kg/cm$^2$ and the temperature of 150 to 300° C. during an average retention time of 2 to 24 hours; obtaining a copolymerized polyester resin composition by carrying out a polycondensation reaction for a product of the esterification reaction or the trans-esterification reaction at the reduced pressure of 400 to 0.1 mmHg and at the temperature of 150 to 300° C. during an average retention time of 1 to 24 hours; and adding an antioxidant selected from the group consisting of a hindered phenolic antioxidant, a phosphitic antioxidant, a thioetheric antioxidant and mixtures thereof during the esterification reaction or polycondensation reaction, or mixing the antioxidant with the produced copolymerized polyester resin, for 95 to 99.99 weight % of the copolymerized polyester resin to be mixed with 0.01 to 5 weight % of the antioxidant.

The copolymerized polyester resin according to the present invention has superior heat-resistance and impact strength because of isosorbide used as a diol component of the copolymerized polyester resin, and has superior color stability (transparency) because of an antioxidant such as a hindered phenolic antioxidant, a phosphitic antioxidant, a thioetheric antioxidant and mixtures thereof.

DETAILED DESCRIPTION OF THE INVENTION

A more complete appreciation of the invention, and many of the attendant advantages thereof, will be better appreciated by reference to the following detailed description.

The copolymerized polyester resin composition according to the present invention comprises a copolymerized polyester resin copolymerized with dicarboxylic acid components and diol components comprising isosorbide, having an alternating structure of dicarboxylic acid moieties which are derived from dicarboxylic acid components and diol moieties which are derived from dial components, and an antioxidant selected from the group consisting of a hindered phenolic antioxidant, a phosphitic antioxidant, a thioetheric antioxidant and mixtures thereof.

As the dicarboxylic acid components used in the present invention, conventional dicarboxylic acid components which are conventionally used for preparing polyester resin, can be used. For example, dicarboxylic acid components such as aromatic dicarboxylic acid components of 8 to 20, preferably 8 to 14 carbon numbers, aliphatic dicarboxylic acid components of 4 to 20, preferably 4 to 12 carbon numbers and mixtures thereof, can be used. Detailed examples of the aromatic dicarboxylic acid components include terephthalic acid, isophthalic acid, naphthalenedicarboxylic acid such as 2,6-naphthalenedicarboxylic acid, diphenyldicarboxylic acid and so on. Detailed examples of the aliphatic dicarboxylic acid components include linear, branched or cyclic aliphatic dicarboxylic acid components such as cyclohexanedicarboxylic acid of 1,4-cyclohexanedicarboxylic acid, 1,3-cyclohexanedicarboxylic acid and so on, phthalic acid, sebasic acid, succinic acid, isodecylsuccinic acid, maleic acid, fumaric acid, adipic acid, glutaric acid, azelaic acid, and so on. One or more of the dicarboxylic acid components can be used at the same time. For example, the terephthalic acid or 1,4-cyclohexanedicarboxylic acid can be used alone, or dicarboxylic acid components except the terephthalic acid or 1,4-cyclohexanedicarboxylic acid may be used as copolymerization dicarboxylic acid components (copolymerization monomers) for improving the properties of the produced polyester resin. The amount of the copolymerization dicarboxylic acid component for improving the properties is 0 to 50 mol %, preferably 0.01 to 40 mol %, for example 0.1 to 30 mol % with respect to the total dicarboxylic acid components. If the amount of the copolymerization dicarboxylic acid components is beyond the range, the properties of the polyester resin may be insufficiently improved or even deteriorated.

In this specification, the term of dicarboxylic acid component include dicarboxylic acids such as terephthalic acid, alkyl ester (lower alkyl(1 to 4 carbon numbers) ester such as monomethyl, monoethyl, dimethyl, diethyl or dibutyl ester) thereof, acid anhydride thereof, and so on, which produce dicarboxylic acid moiety such as terephthaloyl moiety when reacting with glycol (diol) components. Also, in this specification, the dicarboxylic acid moiety or diol moiety represents residue remaining after hydrogens, hydroxyl groups, or alkoxy groups are removed in the polymerization reaction of the dicarboxylic acid components and the diol components.

The diol component used in the present invention surely comprises isosorbide (1,4:3,6-dianhydroglucitol) by 1 to 60 mol %, preferably 4 to 40 mol %, more preferably 10 to 30 mol % with respect to the total diol component. As the remaining components (copolymerization diol components, copolymerization monomers) of the dial components, conventional diol components which are conventionally used for preparing polyester resin, can be used. The amount of the copolymerization diol components is 40 to 99 mol %, preferably 60 to 96 mol %, more preferably 70 to 90 mol % with respect to the total diol components. For example, as the remaining components of the dial components, diol components such as aromatic diol components of 8 to 40, preferably 8 to 33 carbon numbers, aliphatic diol components of 2 to 20, preferably 2 to 12 carbon numbers and mixtures thereof, can be used. Detailed examples of the aromatic dicarboxylic acid components include bisphenol A derivatives (polyoxyethylene-(n)-2,2-bis(4-hydroxyphenyl)propane, polyoxypropylene-(n)-2,2-bis(4-hydroxyphenyl)propane or polyoxypropylene-(n)-polyoxyethylene-(n)-2,2-bis(4-hydroxyphenyl)propane (wherein, n represents the number of polyoxyethylene unit or polyoxypropylene unit) added with ethylene oxide and/or propylene oxide such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, polyoxyethylene-(6)-2,2-bis(4-hydroxyphenyl)propane, and so on. Detailed examples of the aliphatic diol components include linear, branched or cyclic aliphatic diol components such as ethylene glycol, diethylene glycol, triethylene glycol, propanediol (1,2-propanediol, 1,3-propanediol and so on), 1,4-butanediol, pentanediol, hexanediol (1,6-hexanediol and so on), neopentyl glycol (2,2-dimethyl-1,3-propandiol), 1,2-cyclohexanediol, 1,4-cyclohexanediol, 1,2-cyclohexanedimethanol, 1,3-cyclohexanedimethanol, 1,4-cyclohexanedimethanol, tetramethylcyclobutanediol and so on. As the diol components, one or more copolymerization diol components except for the isosorbide can be used at the same time. For example, at least one selected from a group consisting of ethylene glycol, 1,4-cyclohexanedimethanol, polyoxyethylene-(2.0)-2,2-bis(4-hydroxyphenyl)propane may be added to the isosorbide. Especially, in the case of using 1,4-cyclohexanedimethanol as the copolymerization dial components, as the amount of 1,4-cyclohexanedimethanol increases, the impact strength of the copolymerized polyester resin rapidly increases. If the amount of isosorbide is less than 1 mol % or the amount of the copolymerization diol components is more than 99 mol % with respect to the total diol components, the heat-resistance of the copolymerized polyester resin may be insufficient, and if the amount of isosorbide is more than 60 mol % or the amount of the copolymerization diol components is less than 40 mol % with respect to the total diol components, the color of the copolymerized polyester resin or product may become yellow.

The copolymerized polyester resin used in the present invention is copolymerized from the dicarboxylic acid components and the diol components, and shows the intrinsic viscosity of 0.15 dl/g or more, preferably 0.5 dl/g or more, more preferably 0.7 dl/g or more at the temperature of 35° C. after dissolved with orthochlorophenol (OCP) to a concentration of 1.2 g/dl in the copolymerized polyester resin. The notch izod impact strength (ASTM D256 method, measuring temperature: 23° C.) of the test sample of 3.2 mm thick which is prepared from the polyester resin of the present invention measures preferably 50 J/m or more. And the glass transition temperature (Tg) of the polyester resin of the present invention, which is measured during re-heating (2nd scan) with the temperature rising speed of 10° C./min after an annealing treatment at 300° C. for 5 minutes and cooling to room temperature, is preferably 90° C. or more.

The antioxidant used in the present invention is used for increasing the color stability (transparency) of the copolymerized polyester resin composition of the present invention, and is contained in the copolymerized polyester resin composition by mixing during or after the polymerization of the copolymerized polyester resin. As the antioxidant, a hindered phenolic antioxidant, a phosphitic antioxidant, a thioetheric antioxidant, mixtures thereof and so on can be used.

Representative examples of the hindered phenolic antioxidant include 1,3,5-trimethyl-2,4,6-tris(3,5-di-tert-butyl-4-hydroxybenzyl)benzene, 1,6-bis[3-(3,5-di-tert-butyl-4-hydroxyphenyl)propionamido]hexane, 1,6-bis[3-(3,5-di-tert-butyl-4-hydroxyphenyl)propionamido]propane, tetrakis [methylene(3,5-di-tert-butyl-4-hydroxyhydrocinnamate)] methane, and so on.

As the phosphitic antioxidant, a compound represented by Formula 1 can be used.

[Formula 1]

In the Formula 1, $R_1$ and $R_2$ are independently a substituted or unsubstituted alkyl group of 1 to 30, preferably 1 to 20 carbon atoms or a substituted or unsubstituted aryl group of 6 to 30, preferably 6 to 20 carbon atoms. Representative examples of the phosphitic antioxidant include bis(2,6-di-tert-butyl-4-methylphenyl)pentaerythritol-di-phosphite, bis(2,4-di-tert-butylphenyl)pentraerythritol-di-phosphite, and so on.

As the thioetheric antioxidant, a compound represented by Formula 2 or a compound represented by Formula 3 can be used.

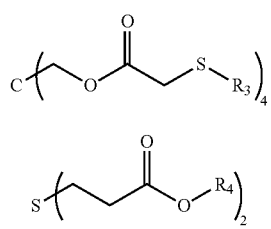

[Formula 2]

[Formula 3]

In the Formulas 2 and 3, $R_3$ and $R_4$ are independently a substituted or unsubstituted alkyl group of 1 to 30, preferably 1 to 20 carbon atoms or a substituted or unsubstituted aryl group of 6 to 30, preferably 6 to 20 carbon atoms. Representative examples of the thioetheric antioxidant include tetrakis[methane-3-(laurylthio)propionate]methane, distearyl thiodipropionate, dilauryl thiodipropionate, and so on.

The copolymerized polyester resin composition of the present invention comprises 95 to 99.99 weight %, preferably 96 to 99 weight % of the copolymerized polyester resin and 0.01 to 5 weight %, preferably 1 to 4 weight % of the antioxidant. If the amount of the copolymerized polyester resin is less than 95 weight % or the amount of the antioxidant is more than 5 weight % with respect to the total copolymerized polyester resin composition, haze may occur and transparency may be deteriorated. If the amount of the copolymerized polyester resin is more than 99.99 weight % or the amount of the antioxidant is less than 0.01 weight % with respect to the total copolymerized polyester resin composition, yellowing may occur and the color stability (transparency) of the copolymerized polyester resin composition may be deteriorated.

The copolymerized polyester resin of the present invention has superior color stability (transparency), heat-resistance and impact strength, and is suitable for producing a polyester resin article selected from the group consisting of a film, a sheet, a drink bottle, a baby bottle, a fiber, an optical product, and so on.

Hereinafter, the method for preparing polyester resin of the present invention will be described. First, (a) the dicarboxylic acid components and the diol components comprising isosorbide are subject to an esterification reaction or a trans-esterification reaction at the increased pressure of 0 to 10.0 kg/cm² and the temperature of 150 to 300° C. during an average retention time of 1 to 24 hours. And, (b) the product of the esterification reaction or the trans-esterification reaction is subject to a polycondensation reaction at the reduced pressure of 400 to 0.01 mmHg and at the temperature of 150 to 300° C. during an average retention time of 1 to 24 hours to produce the copolymerized polyester resin. Then, (c) the copolymerized polyester resin composition of the present invention can be prepared by adding the antioxidant selected from the group consisting of a hindered phenolic antioxidant, a phosphitic antioxidant, a thioetheric antioxidant and mixtures thereof during the esterification reaction or polycondensation reaction, or by mixing the antioxidant with the produced copolymerized polyester resin, for 95 to 99.99 weight % of the copolymerized polyester resin to be mixed with 0.01 to 5 weight % of the antioxidant. Wherein, it is preferable that the esterification reaction and the polycondensation reaction are carried out under an inert gas atmosphere, and the mixing process of the copolymerized polyester resin and the antioxidant may be a simple mixing or a mixing through extruding.

The polymerization conditions for preparing the copolymerized polyester resin composition of the present invention will be described in more detail. For preparing the copolymerized polyester resin comprising isosorbide, firstly, the mole ratio of the total diol (glycol) components comprising isosorbide with respect to the total dicarboxylic acid components comprising terephthalic acid and so on is controlled to 1.05 to 3.0, preferably 1.1 to 2.0, more preferably 1.2 to 1.8, and the esterification reaction is carried out at the temperature of 150 to 300° C., preferably 200 to 270° C., more preferably 240 to 260° C. and at the pressure of 0 to 10.0 kg/cm², preferably 0 to 5.0 kg/cm², more preferably 0.1 to 3.0 kg/cm². Wherein, if the mole ratio of the diol components/dicarboxylic acid components is less than 1.05, there may be unreacted residual dicarboxylic acid components during the polymerization reaction, which cause the transparency of the resin to be deteriorated. If the mole ratio is more than 3.0, the polymerization reaction rate may decrease and the productivity of the resin may be unsatisfactory. Moreover, if the temperature and the pressure are beyond the range, properties of the copolymerized polyester resin may be deteriorated. The reaction time (average retention time) of the esterification reaction is generally 1 to 24 hours, preferably 2 to 8 hours, which can be varied according to the reaction temperature, the reaction pressure, and the mole ratio of glycol components with respect to dicarboxylic acid components.

The process for preparing copolymerized polyester resin can be divided into the esterification reaction ((a) step) and the polycondensation reaction ((b) step). The esterification reaction does not require catalyst, but catalyst can be used to reduce the reaction time. The esterification reaction ((a) step) can be carried out in a batch process or a continuous process. Each reactant can be introduced into a reactor separately, but it is preferable to introduce a slurry of the mixture of the diol components and the dicarboxylic acid components into the reactor. Wherein, the glycol components such as isosorbide which are solids at room temperature, can be dissolved with water or ethylene glycol, and then mixed with the dicarboxylic acid components such as terephthalic acid to form a slurry. Alternatively, water can be added to a slurry including dicarboxylic acid components and copolymerization glycol components such as isosorbide and ethylene glycol to increase the solubility of isosorbide, or the slurry can be prepared at the increased temperature of 60° C. or more so that isosorbide can be melted in the slurry.

After completion of the esterification reaction ((a) step), the polycondensation reaction ((b) step) is carried out. Before the initiation of the polycondensation reaction ((b) step), a polycondensation catalyst, a stabilizer, a decoloring agent and other additives can be added to the product of the esterification reaction or the trans-esterification reaction. Examples of the polycondensation catalyst include conventional titanium based catalyst, germanium based catalyst, antimony based catalyst, aluminum based catalyst, tin based catalyst, and mixtures thereof. Examples of the preferable titanium based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, titanium dioxide/silicon dioxide co-precipitates, titanium dioxide/zirconium dioxide co-precipitates, and so on. And, examples of the preferable germanium based catalyst include germanium dioxide and co-precipitates of germanium dioxide. Generally, as the stabilizer for the polycondensation reaction, phosphor based stabilizers such as phosphoric acid, trimethyl phosphate, triethyl phosphate, and so on, can be used. Regarding the amount of the stabilizer, the amount of phosphor of the stabilizer is 10 to 100 ppm with respect to the total weight of the produced polyester resin(copolymerized polyester resin). If the amount of phosphor of the stabilizer is less than 10 ppm, the polyester resin may not be sufficiently stabilized and the color of the polyester resin may become yellow. If the amount of phosphor is more than 100 ppm, the polymerization degree of the polyester resin may be insufficient. Examples of the decoloring agent to improve the color property of the polyester resin include conventional decoloring agents such as cobalt acetate, cobalt propionate and so on. And if necessary, organic decoloring agent can be used as the decoloring agent. The preferable amount of the decoloring agent is 0 to 100 ppm with respect to the total weight of the produced polyester resin. Generally, the polycondensation reaction is carried out at the temperature of 150 to 300° C., preferably 200 to 290° C., more preferably 260 to 280° C. and at the reduced pressure of 400 to 0.01 mmHg, preferably 100 to 0.05 mmHg, more preferably 10 to 0.1 mmHg. The reduced pressure of 400 to 0.01 mmHg is maintained in order to remove glycol which is a by-product of the polycondensation reaction. Therefore, if the reduced pressure is beyond the range, the by-product may not be sufficiently removed. Moreover, if the polycondensation reaction temperature is beyond the range, properties of the copolymerized polyester resin may be deteriorated. The polycondensation reaction is carried out until desirable intrinsic viscosity of the polyester resin can be obtained, for example, can be carried out during an average retention time of 1 to 24 hours.

Finally, the copolymerized polyester resin composition of the present invention can be prepared by adding the antioxidant during the esterification reaction or polycondensation reaction, or mixing the antioxidant with the produced copolymerized polyester resin.

Hereinafter, the preferable examples are provided for better understanding of the present invention. However, the present invention is not limited by the following examples.

In the following Examples and Comparative Examples, TPA, AA, CHDA, ISB, CHDM, EG and BPA-EO represent a terephthalic acid, an adipic acid, a 1,4-cyclohexane dicarboxylic acid, isosorbide (1,4:3,6-dianhydroglucitol), 1,4-cyclohexanedimethanol, ethylene glycol, and polyoxyethylene-(2.0)-2,2-bis(4-hydroxyphenyl)propane respectively, and the method for performance evaluation of polymers is as follows.

(1) Intrinsic viscosity (IV): Measure the IV of the polymer using Ubbelohde viscometer in a thermostat of 35° C. after dissolving the polymer in orthochlorophenol (OCP) at 150° C. by the concentration of 0.12%.

(2) Heat-resistance (Glass-rubber transition temperature (Tg)): Measure the Tg of the polyester resin during 2nd scanning with the temperature increasing speed of 10° C./min, after annealing the polyester resin at 300° C. for 5 minutes and cooling to room temperature.

(3) Color stability (Color L and Color b): Measure the Color L and Color b using Colorgard System of Pacific Scientific Company.

(4) Haze (%): Measure Haze (%) of independent 3 positions of the film sample of the copolymerized polyester resin, the polyester resin being aged at 23° C. and 65% RH during 24 hours using Haze meter (device name: NDH2000, Nippon Denshoku (Japan)) according to JIS (Japanese Industrial Standards) K7136, and calculate the average value of each measuring results as the result value.

Comparative Examples 1 to 3

Preparation of Copolymerized Polyester Resin

According to the amount described in Table 1, reactants were added in a reactor of 7 L volume, and 200 ppm of a germanium based catalyst, 70 ppm of a phosphate based stabilizer, and 50 ppm of a cobalt based decoloring agent were added (based on the atom of each core element). And, the reactor was heated to 240 to 300° C. to carry out an esterification reaction. A polycondensation reaction was started after water, a by-product, flows out by 70 to 99 weight %, and terminated at certain viscosity. The intrinsic viscosity (IV), heat-resistance (Tg), Color L and Color b of the copolymerized polyester resin were measured, and represented in Table 1.

Examples 1 to 6 and Comparative Example 4

Preparation of Copolymerized Polyester Resin Composition

Copolymerized polyester resin was prepared by the compositions according to Table 1. Except for mixing at least one of tetrakis[methylene(3,5-di-tert-butyl-4-hydroxy hydrocinnamate)]methane (AO1), bis(2,6-di-tert-butyl-4-methylphenyl)pentaerythritol-di-phosphite (AO2), and tetrakis[methane-3-(laurylthio)propionate]methane (AO3) (adding by ppm with respect to the total copolymerized polyester resin composition) during or after preparation of copolymerized polyester resin, polyester resin composition was prepared by the same manner described in Comparative Example 1. Intrinsic viscosity (IV), heat-resistance (Tg), Color L and Color b of the copolymerized polyester resin were measured, and represented in Table 1.

TABLE 1

|  | Comparative Example | | | | Example | | | | | |
| --- | --- | --- | --- | --- | --- | --- | --- | --- | --- | --- |
|  | 1 | 2 | 3 | 4 | 1 | 2 | 3 | 4 | 5 | 6 |
| TPA(%) | 100 | 80 | 0 | 100 | 100 | 100 | 100 | 100 | 80 | 0 |
| AA(%) | 0 | 20 | 0 | 0 | 0 | 0 | 0 | 0 | 20 | 0 |
| CHDA(%) | 0 | 0 | 100 | 0 | 0 | 0 | 0 | 0 | 0 | 100 |
| ISB(%) | 20 | 20 | 20 | 20 | 20 | 20 | 20 | 20 | 20 | 20 |
| CHDM(%) | 50 | 0 | 30 | 50 | 50 | 50 | 50 | 50 | 0 | 30 |
| EG(%) | 30 | 50 | 0 | 30 | 30 | 30 | 30 | 30 | 50 | 0 |

TABLE 1-continued

|  | Comparative Example | | | | Example | | | | | |
| --- | --- | --- | --- | --- | --- | --- | --- | --- | --- | --- |
|  | 1 | 2 | 3 | 4 | 1 | 2 | 3 | 4 | 5 | 6 |
| BPA-EO(%) | 0 | 30 | 50 | 0 | 0 | 0 | 0 | 0 | 30 | 50 |
| AO1(ppm) | 0 | 0 | 0 | 30000 | 1000 | 5000 | 0 | 5000 | 5000 | 5000 |
| AO2(ppm) | 0 | 0 | 0 |  | 0 |  | 5000 | 5000 |  |  |
| AO3(ppm) | 0 | 0 | 0 | 30000 | 1000 | 5000 | 5000 | 0 | 5000 | 5000 |
| IV(dl/g) | 0.70 | 0.80 | 0.75 | 0.10 | 0.70 | 0.70 | 0.70 | 0.70 | 0.80 | 0.75 |
| Heat-resistance (Tg, ° C.) | 107 | 75 | 50 | 85 | 107 | 107 | 107 | 107 | 75 | 50 |
| Color L | 64 | 63 | 63 | 70 | 65 | 67 | 67 | 67 | 65 | 65 |
| Color b | 1 | 2 | 2 | −1 | 0 | −1 | −1 | −1 | 0 | 0 |

In Table 1, the proportions (%) of dicarboxylic acid components and diol components are the proportions of dicarboxylic acid components and diol component which are contained in resultant copolymerized polyester resin, and identified by a nuclear magnetic resonance analysis (NMR analysis). As shown in Table 1, the polyester resin compositions (Examples 1 to 6) comprising antioxidants according to the present invention have relatively superior color stability (Color L and Color b) to the conventional copolymerized polyester resins (Comparative Examples 1 to 3). However, if the amount of antioxidant is more than 5 weight % with respect to the total copolymerized polyester resin composition (Comparative Example 4), the reaction rate would be very slow so that the copolymerized polyester resin composition with desired polymerization degree (more than 1.5 dl/g) cannot be obtained.

Comparative Examples 5 to 7

Preparation of Polyester Resin Article

According to Table 2, the copolymerized polyester resins prepared in Comparative Examples 1 to 3 were decompressed and dried during 6 hours at 40° C. in a vacuum of 1 torr, and then extruded to sheets from the 20 mm-diameter twin screw extruder with T-die at the extrusion temperature listed in Table 2. The polyester resin articles (sheets) were made by an electrostatic induced casting on a drum chilled to 5° C. Color L, Color b and haze (%) of the sheets were measured and represented in Table 2.

Examples 7 to 13

Preparation of Polyester Resin Article

According to Table 2, the copolymerized polyester resins prepared in Comparative Examples 1 to 3 were cold-blended with at least one of tetrakis[methylene(3,5-di-tert-butyl-4-hydroxy hydrocinnamate)]methane (AO1), bis(2,6-di-tert-butyl-4-methylphenyl)pentaerythritol-di-phosphite (A02), and tetrakis[methane-3-(laurylthio)propionate]methane (A03), and decompressed and dried during 6 hours at 40° C. in a vacuum of 1 torr, and then extruded to sheets from the 20 mm-diameter twin screw extruder with T-die at the extrusion temperature listed in Table 2. The polyester resin articles (sheets) were made by an electrostatic induced casting on a drum chilled to 5° C. Color L, Color b and haze (%) of the sheets were measured and represented in Table 2.

TABLE 2

|  | Comparative Example | | | Example | | | | | | |
| --- | --- | --- | --- | --- | --- | --- | --- | --- | --- | --- |
|  | 5 | 6 | 7 | 7 | 8 | 9 | 10 | 11 | 12 | 13 |
| Resin | A | B | C | A | A | A | A | A | B | C |
| AO1(ppm) | 0 | 0 | 0 | 500 | 1000 | 3000 | 0 | 1000 | 0 | 1500 |
| AO2(ppm) | 0 | 0 | 0 | 0 | 0 | 0 | 1000 | 2000 | 1500 | 1500 |
| AO3(ppm) | 0 | 0 | 0 | 500 | 2000 | 5000 | 1000 | 0 | 1500 | 0 |
| Extrusion Temp. (° C.) | 270 | 240 | 240 | 270 | 270 | 270 | 270 | 270 | 240 | 240 |
| Color L | 61 | 60 | 60 | 62 | 63 | 64 | 63 | 63 | 62 | 62 |
| Color b | 3 | 5 | 5 | 2 | 2 | 1 | 2 | 2 | 3 | 3 |
| Haze(%) | 0 | 0 | 0 | 0 | 0 | 4.8 | 0 | 0 | 0 | 0 |

(A: copolymerized polyester resin prepared in Comparative Example 1, B: copolymerized polyester resin prepared in Comparative Example 2, C: copolymerized polyester resin prepared in Comparative Example 3)

As shown in Table 2, the polyester resin articles (sheets, Examples 7 to 13) according to the present invention have relatively superior color stability (Color L and Color b) to the conventional polyester resin articles (sheets, Comparative Examples 5 to 7) in which antioxidant is not blended.

The invention claimed is:

1. A copolymerized polyester resin composition comprising:
   95 to 99.99 weight % of a copolymerized polyester resin copolymerized with dicarboxylic acid components and diol components comprising isosorbide, having an alternating structure of dicarboxylic acid moieties which are derived from the dicarboxylic acid components and diol moieties which are derived from the diol components; and
   0.01 to 5 weight % of an antioxidant selected from a group consisting of a hindered phenolic antioxidant, a phosphitic antioxidant, a thioetheric antioxidant and mixtures thereof;
   wherein the diol components comprise 1 to 60 mol % of isosorbide and 40 to 99 mol % of 1,4-cyclohexane dimethanol, and the copolmerized polyester resin has a glass transition temperature (Tg) of 90° C. or more.

2. The copolymerized polyester resin composition according to claim 1, wherein the dicarboxylic acid components are selected from a group consisting of aromatic dicarboxylic acid components of 8 to 20 carbon numbers, aliphatic dicarboxylic acid components of 4 to 20 carbon numbers and mixtures thereof.

3. The copolymerized polyester resin composition according to claim 1, wherein the phosphitic antioxidant compound represented by Formula 1,

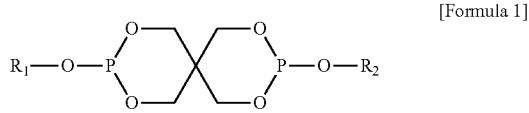

[Formula 1]

in the Formula 1, $R_1$ and $R_2$ are independently a substituted or unsubstituted alkyl group of 1 to 30 carbon atoms or a substituted or unsubstituted aryl group of 6 to 30 carbon atoms.

4. The copolymerized polyester resin composition according to claim 1, wherein the thioetheric antioxidant is a compound represented by Formula 2 or Formula 3,

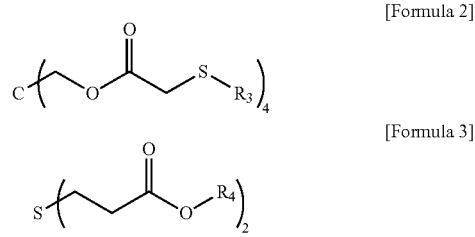

[Formula 2]

[Formula 3]

in the Formulas 2 and 3, $R_3$ and $R_4$ are independently a substituted or unsubstituted alkyl group of 1 to 30 carbon atoms or a substituted or unsubstituted aryl group of 6 to 30 carbon atoms.

5. The copolymerized polyester resin composition according to claim 1, wherein the copolymerized polyester resin has the intrinsic viscosity of 0.15 dl/g or more at the temperature of 35° C. after dissolved with orthochlorophenol to a concentration of 1.2 g/dl in the copolymerized polyester resin.

6. A polyester resin article selected from the group consisting of a film, a sheet, a drink bottle, a baby bottle, a fiber, and an optical product which is produced with the copolymerized polyester resin composition according to claim 1.

7. A method for preparing copolymerized polyester resin composition, comprising the steps of:
carrying out an esterification reaction or a trans-esterification reaction of dicarboxylic acid components, and diol components comprising isosorbide at the increased pressure of 0 to 10.0 kg/cm² and the temperature of 150 to 300° C. during an average retention time of 2 to 24 hours;
obtaining a copolymerized polyester resin composition by carrying out a polycondensation reaction for a product of the esterification reaction or the trans-esterification reaction at the reduced pressure of 400 to 0.1 mmHg and at the temperature of 150 to 300° C. during an average retention time of 1 to 24 hours; and
adding an antioxidant selected from a group consisting of a hindered phenolic antioxidant, a phosphitic antioxidant, a thioetheric antioxidant and mixtures thereof during the esterification reaction or polycondensation reaction, or mixing the antioxidant with the produced copolymerized polyester resin, for 95 to 99.99 weight % of the copolymerized polyester resin to be mixed with 0.01 to 5 weight % of the antioxidant;
wherein the diol components comprise 1 to 60 mol % of isosorbide and 40 to 99 mol % of 1,4-cyclohexane dimethanol, and the copolmerized polyester resin has a glass transition temperature (Tg) of 90° C. or more.

8. The method for preparing copolymerized polyester resin composition according to claim 7, wherein the dicarboxylic acid components are selected from a group consisting of aromatic dicarboxylic acid components of 8 to 20 carbon numbers, aliphatic dicarboxylic acid components of 4 to 20 carbon numbers and mixtures thereof.

9. The method for preparing copolymerized polyester resin composition according to claim 7, wherein the phosphitic antioxidant is a compound represented by Formula 1,

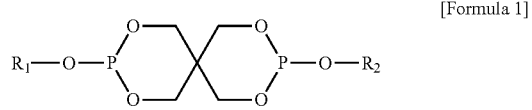

[Formula 1]

in the Formula 1, $R_1$ and $R_2$ are independently a substituted or unsubstituted alkyl group of 1 to 30 carbon atoms or a substituted or unsubstituted aryl group of 6 to 30 carbon atoms.

10. The method for preparing copolymerized polyester resin composition according to claim 7, wherein the thioetheric antioxidant is a compound represented by Formula 2 or Formula 3,

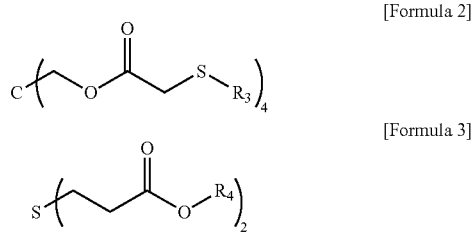

[Formula 2]

[Formula 3]

in the Formulas 2 and 3, $R_3$ and $R_4$ are independently a substituted or unsubstituted alkyl group of 1 to 30 carbon atoms or a substituted or unsubstituted aryl group of 6 to 30 carbon atoms.

11. The method for preparing copolymerized polyester resin composition according to claim 7, wherein the copolymerized polyester resin has the intrinsic viscosity of 0.15 dl/g or more at the temperature of 35° C. after dissolved with orthochlorophenol to a concentration of 1.2 g/dl in the copolymerized polyester resin.

* * * * *